United States Patent
Xu et al.

(10) Patent No.: US 12,294,543 B2
(45) Date of Patent: May 6, 2025

(54) PHASE CONTINUITY FOR DEMODULATION REFERENCE SIGNAL BUNDLING

(71) Applicant: QUALCOMM Incorporated, San Diego, CA (US)

(72) Inventors: Huilin Xu, Temecula, CA (US); Wanshi Chen, San Diego, CA (US); Krishna Kiran Mukkavilli, San Diego, CA (US); Jing Lei, San Diego, CA (US); Yuchul Kim, San Diego, CA (US); Hung Dinh Ly, San Diego, CA (US); Hwan Joon Kwon, San Diego, CA (US); Peter Gaal, San Diego, CA (US); Gokul Sridharan, Sunnyvale, CA (US); Chao Wei, Beijing (CN)

(73) Assignee: Qualcomm Incorporated, Dan Diego (CA)

( * ) Notice: Subject to any disclaimer, the term of this patent is extended or adjusted under 35 U.S.C. 154(b) by 371 days.

(21) Appl. No.: 17/999,354

(22) PCT Filed: Jul. 28, 2020

(86) PCT No.: PCT/CN2020/105031
§ 371 (c)(1),
(2) Date: Nov. 18, 2022

(87) PCT Pub. No.: WO2022/021041
PCT Pub. Date: Feb. 3, 2022

(65) Prior Publication Data
US 2023/0188291 A1    Jun. 15, 2023

(51) Int. Cl.
H04L 5/00 (2006.01)
(52) U.S. Cl.
CPC .......... H04L 5/0051 (2013.01); H04L 5/0085 (2013.01)

(58) Field of Classification Search
CPC .... H04L 5/0051; H04L 5/0048; H04L 5/0085
See application file for complete search history.

(56) References Cited

U.S. PATENT DOCUMENTS

| 2018/0227074 A1 | 8/2018 | Sun et al. |
| 2019/0174466 A1 | 6/2019 | Zhang et al. |

(Continued)

FOREIGN PATENT DOCUMENTS

| CN | 107889150 A | 4/2018 |
| CN | 109379172 A | 2/2019 |

(Continued)

OTHER PUBLICATIONS

Qualcomm Incorporated: "Potential Techniques for Coverage Enhancements", 3GPP TSG-RAN WG1 Meeting #101, R1-2004499, 3rd Generation Partnership Project, Mobile Competence Centre, 650, Route Des Lucioles, F-06921 Sophia-Antipolis Cedex, France, vol. RAN WG1. No. e-Meeting, May 25, 2020-Jun. 5, 2020, May 16, 2020, XP052345877, 15 Pages, XP051886228, section 4.

(Continued)

*Primary Examiner* — Shukri Taha
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, an indication that a plurality of physical downlink shared channel (PDSCH) communications are associated for purposes of demodulation reference signal bundling. The UE may determine whether a phase continuity is to be maintained for the plurality of PDSCH communications based at least in part on respective quasi-co-location assumptions for the plurality of PDSCH communications. The UE may process the plu- (Continued)

rality of PDSCH communications based at least in part on whether the phase continuity is to be maintained Numerous other aspects are provided.

35 Claims, 7 Drawing Sheets

(56) References Cited

U.S. PATENT DOCUMENTS

| | | |
|---|---|---|
| 2019/0222380 A1 | 7/2019 | Manolakos et al. |
| 2019/0281587 A1 | 9/2019 | Zhang et al. |
| 2020/0052844 A1* | 2/2020 | Yu .................. H04L 5/0051 |
| 2020/0059346 A1 | 2/2020 | Yoo et al. |
| 2020/0162133 A1 | 5/2020 | Harrison et al. |
| 2022/0077982 A1* | 3/2022 | Zhang .............. H04L 5/0014 |

FOREIGN PATENT DOCUMENTS

| | | |
|---|---|---|
| CN | 110291744 | 9/2019 |
| CN | 111149321 A | 5/2020 |
| WO | 2019204498 | 10/2019 |

OTHER PUBLICATIONS

Supplementary European Search Report—EP20947004—Search Authority—The Hague—Mar. 15, 2024.
International Search Report and Written Opinion—PCT/CN2020/105031—ISA/EPO—Apr. 19, 2021.
Taiwan Search Report—TW110122885—TIPO—Nov. 26, 2024.

* cited by examiner

PHASE CONTINUITY FOR DEMODULATION REFERENCE SIGNAL BUNDLING

CROSS-REFERENCE TO RELATED APPLICATION

This Patent Application is a 371 national stage of PCT Application No. PCT/CN2020/105031 filed on Jul. 28, 2020, entitled "PHASE CONTINUITY FOR DEMODULATION REFERENCE SIGNAL BUNDLING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for phase continuity for demodulation reference signal (DMRS) bundling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes: receiving, from a base station, an indication that a plurality of physical downlink shared channel (PDSCH) communications are associated for purposes of demodulation reference signal (DMRS) bundling; determining whether a phase continuity is to be maintained for the plurality of PDSCH communications based at least in part on respective quasi-co-location (QCL) assumptions for the plurality of PDSCH communications; and processing the plurality of PDSCH communications based at least in part on whether the phase continuity is to be maintained.

In some aspects, a method of wireless communication performed by a base station includes: transmitting, to a UE, an indication that a plurality of PDSCH communications are associated for purposes of DMRS bundling; determining whether a phase continuity is to be maintained for the plurality of PDSCH communications based at least in part on respective QCL assumptions for the plurality of PDSCH communications; and transmitting, to the UE, the plurality of PDSCH communications based at least in part on whether the phase continuity is to be maintained.

In some aspects, a UE for wireless communication includes: a memory; and one or more processors operatively coupled to the memory, the memory and the one or more processors configured to: receive, from a base station, an indication that a plurality of PDSCH communications are associated for purposes of DMRS bundling; determine whether a phase continuity is to be maintained for the plurality of PDSCH communications based at least in part on respective QCL assumptions for the plurality of PDSCH communications; and process the plurality of PDSCH communications based at least in part on whether the phase continuity is to be maintained.

In some aspects, a base station for wireless communication includes: a memory; and one or more processors operatively coupled to the memory, the memory and the one or more processors configured to: transmit, to a UE, an indication that a plurality of PDSCH communications are associated for purposes of DMRS bundling; determine whether a phase continuity is to be maintained for the plurality of PDSCH communications based at least in part on respective QCL assumptions for the plurality of PDSCH communications; and transmit, to the UE, the plurality of PDSCH communications based at least in part on whether the phase continuity is to be maintained.

In some aspects, a non-transitory computer-readable medium storing a set of instructions for wireless communication includes: one or more instructions that, when executed by one or more processors of a UE, cause the UE to: receive, from a base station, an indication that a plurality of PDSCH communications are associated for purposes of DMRS bundling; determine whether a phase continuity is to be maintained for the plurality of PDSCH communications based at least in part on respective QCL assumptions for the plurality of PDSCH communications; and process the plurality of PDSCH communications based at least in part on whether the phase continuity is to be maintained.

In some aspects, a non-transitory computer-readable medium storing a set of instructions for wireless communication includes: one or more instructions that, when executed by one or more processors of a base station, cause the base station to: transmit, to a UE, an indication that a plurality of PDSCH communications are associated for purposes of DMRS bundling; determine whether a phase continuity is to be maintained for the plurality of PDSCH communications based at least in part on respective QCL assumptions for the plurality of PDSCH communications; and transmit, to the UE, the plurality of PDSCH communications based at least in part on whether the phase continuity is to be maintained.

In some aspects, an apparatus for wireless communication includes: means for receiving, from a base station, an indication that a plurality of PDSCH communications are associated for purposes of DMRS bundling; means for determining whether a phase continuity is to be maintained for the plurality of PDSCH communications based at least in part on respective QCL assumptions for the plurality of PDSCH communications; and means for processing the plurality of PDSCH communications based at least in part on whether the phase continuity is to be maintained.

In some aspects, an apparatus for wireless communication includes: means for transmitting, to a UE, an indication that a plurality of PDSCH communications are associated for purposes of DMRS bundling; means for determining whether a phase continuity is to be maintained for the plurality of PDSCH communications based at least in part on respective QCL assumptions for the plurality of PDSCH communications; and means for transmitting, to the UE, the plurality of PDSCH communications based at least in part on whether the phase continuity is to be maintained.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
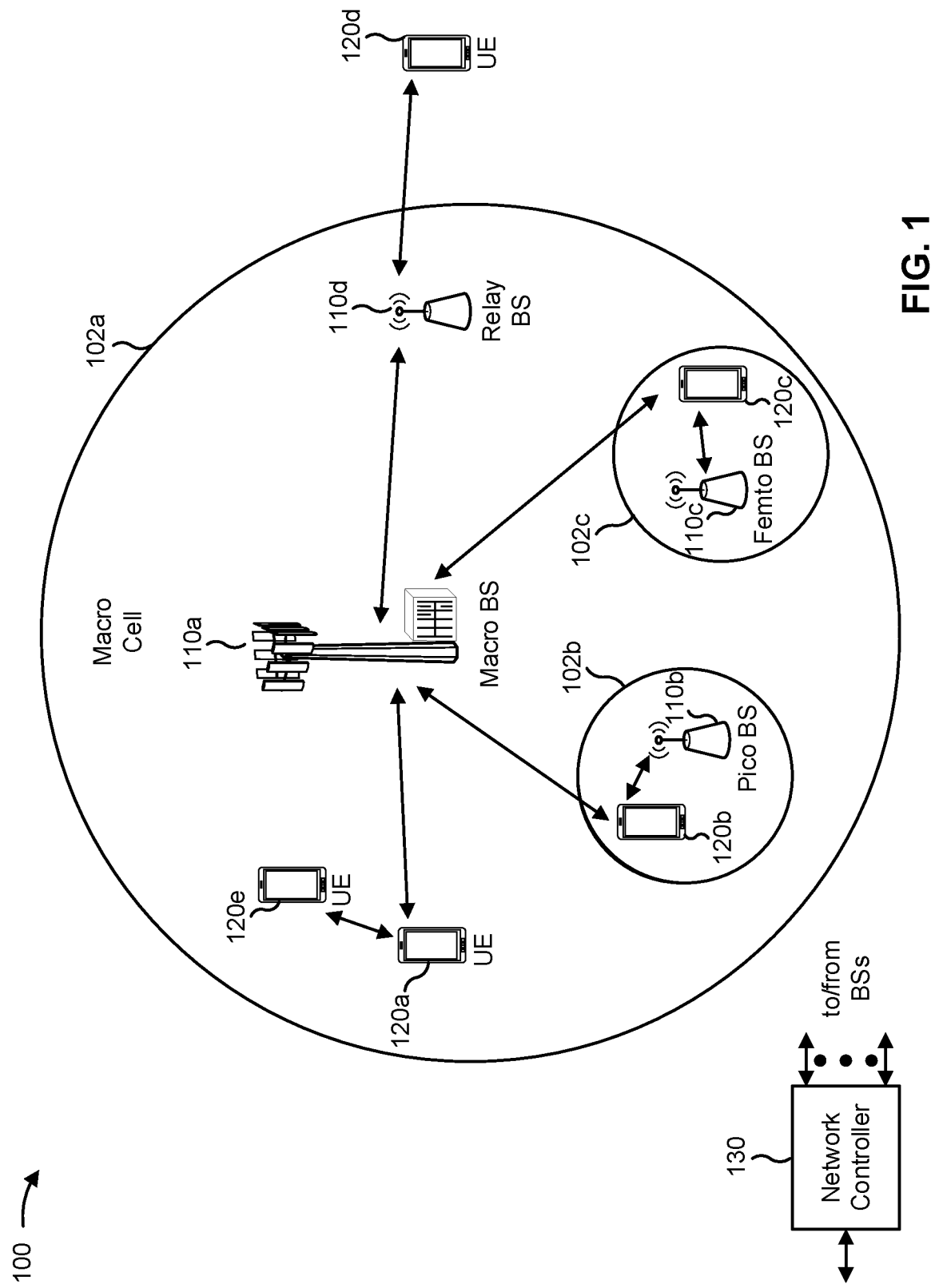
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
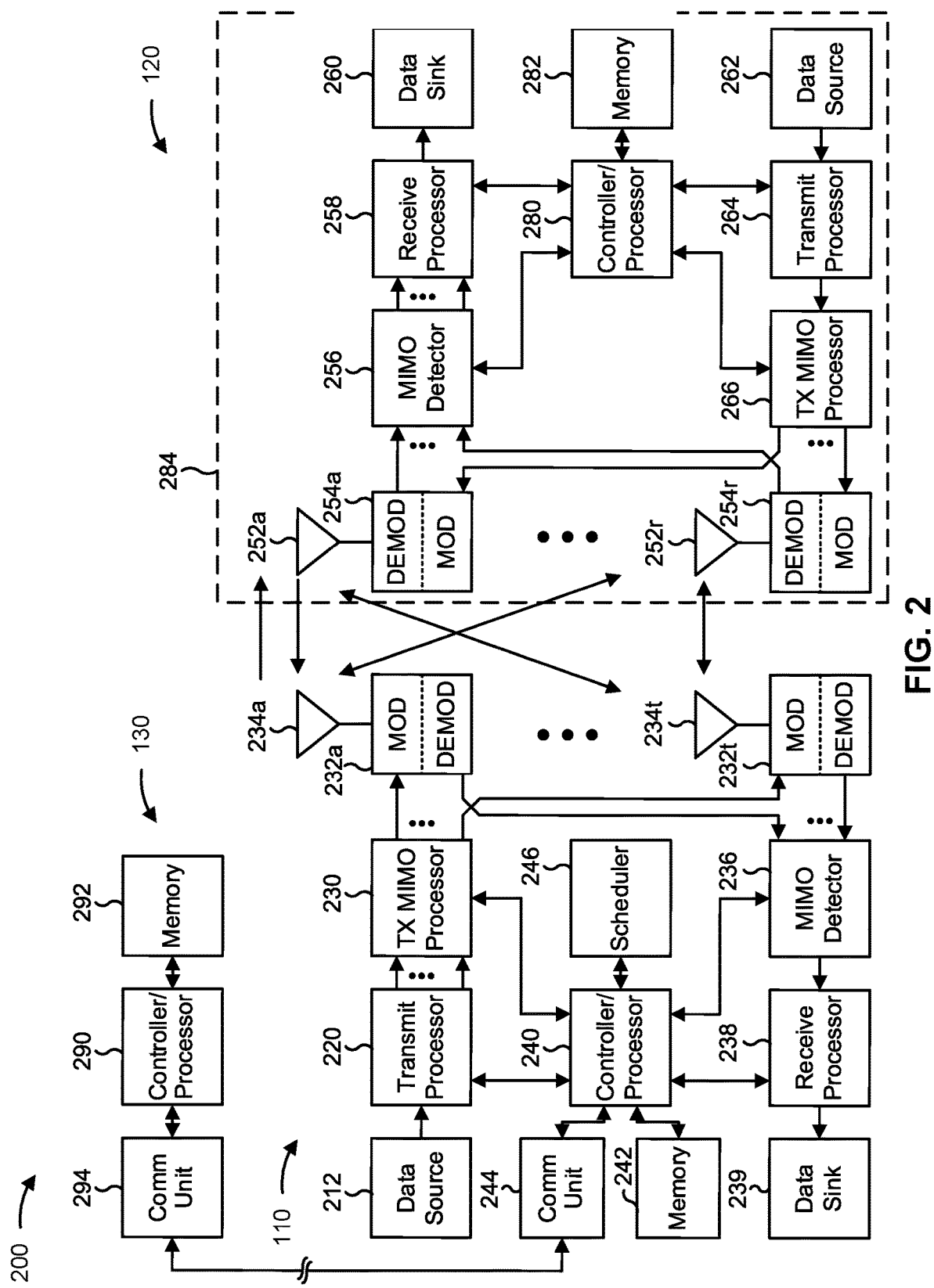
FIG. 2 is a diagram illustrating an example of a base station in communication with a user equipment (UE) in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-7.

Controller/processor 240 of base station 110, controller/processor 280 of UE 120, and/or any other component(s) of FIG. 2 may perform one or more techniques associated with phase continuity for demodulation reference signal (DMRS) bundling, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, interpreting the instructions, and/or the like.

In some aspects, UE 120 may include means for receiving (e.g., using antenna 252, DEMOD 254, MIMO detector 256, receive processor 258, controller/processor 280, and/or the like), from a base station, an indication that a plurality of PDSCH communications are associated for purposes of DMRS bundling, means for determining (e.g., using controller/processor 280, memory 282, and/or the like) whether a phase continuity is to be maintained for the plurality of PDSCH communications based at least in part on respective QCL assumptions for the plurality of PDSCH communications, means for processing (e.g., using controller/processor 280, memory 282, and/or the like) the plurality of PDSCH communications based at least in part on whether the phase continuity is to be maintained, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting (e.g., using controller/processor 240, transmit processor 220, TX MIMO processor 230, MOD 232, antenna 234, and/or the like), to a UE, an indication that a plurality of PDSCH communications are associated for purposes of DMRS bundling, means for determining (e.g., using controller/processor 240, memory 242, and/or the like) whether a phase continuity is to be maintained for the plurality of PDSCH communications based at least in part on respective QCL assumptions for the plurality of PDSCH communications, means for transmitting (e.g., using controller/processor 240, transmit processor 220, TX MIMO processor 230, MOD 232, antenna 234, and/or the like), to the UE, the plurality of PDSCH communications based at least in part on whether the phase continuity is to be maintained, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
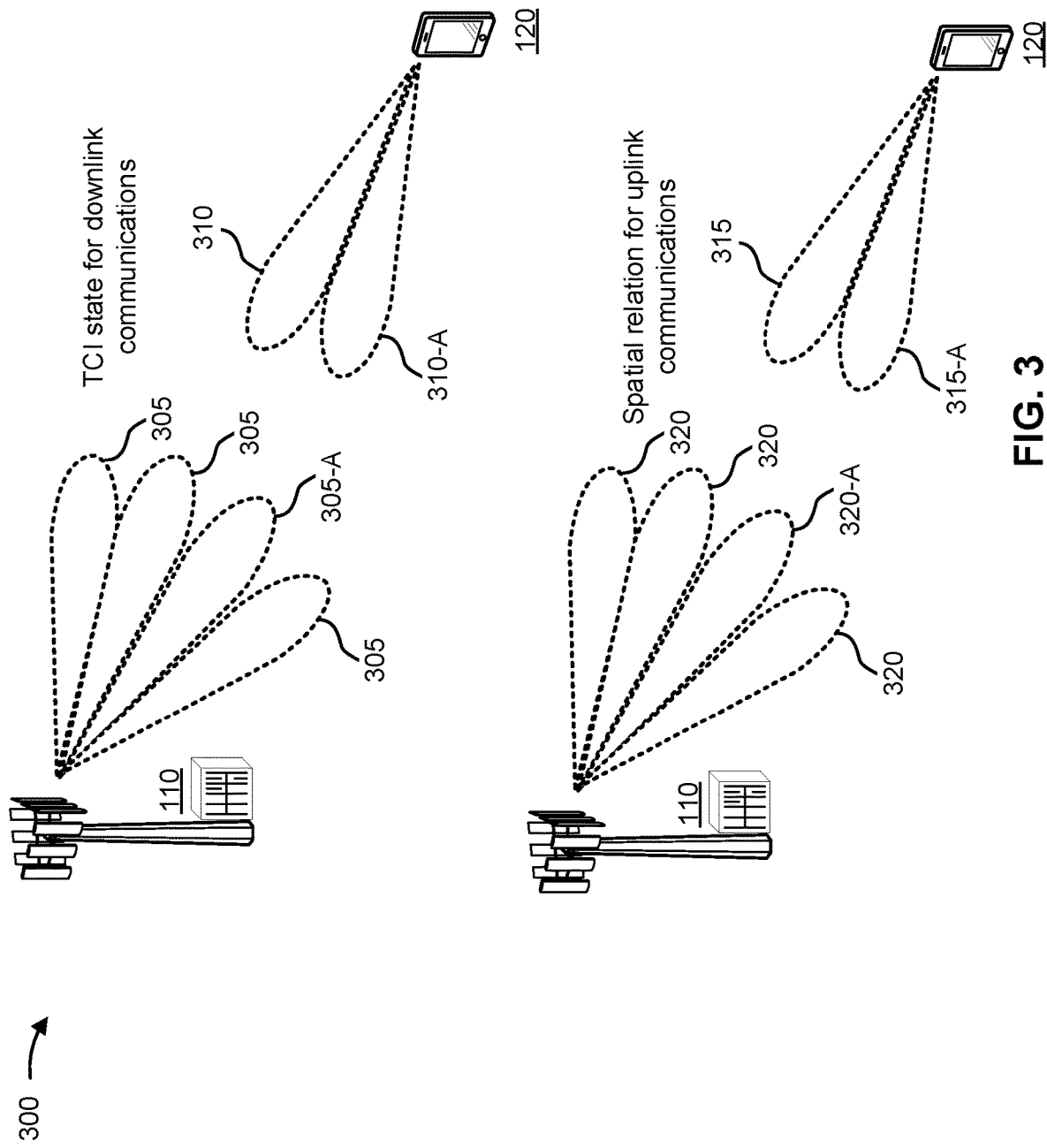
FIG. 3 is a diagram illustrating an example of using beams for communications between a base station and a UE, in accordance with various aspects of the present disclosure.

FIG. 3 is a diagram illustrating an example 300 of using beams for communications between a base station and a UE, in accordance with various aspects of the present disclosure. As shown in FIG. 3, a base station 110 and a UE 120 may communicate with one another.

The base station 110 may transmit to UEs 120 located within a coverage area of the base station 110. The base station 110 and the UE 120 may be configured for beamformed communications, where the base station 110 may transmit in the direction of the UE 120 using a directional BS transmit beam, and the UE 120 may receive the transmission using a directional UE receive beam. Each BS transmit beam may have an associated beam ID, beam direction, or beam symbols, among other examples. The base station 110 may transmit downlink communications via one or more BS transmit beams 305.

The UE 120 may attempt to receive downlink transmissions via one or more UE receive beams 310, which may be configured using different beamforming parameters at receive circuitry of the UE 120. The UE 120 may identify a particular BS transmit beam 305, shown as BS transmit beam 305-A, and a particular UE receive beam 310, shown as UE receive beam 310-A, that provide relatively favorable performance (for example, that have a best channel quality of the different measured combinations of BS transmit beams 305 and UE receive beams 310). In some examples, the UE 120 may transmit an indication of which BS transmit beam 305 is identified by the UE 120 as a preferred BS transmit beam, which the base station 110 may select for transmissions to the UE 120. The UE 120 may thus attain and maintain a beam pair link (BPL) with the base station 110 for downlink communications (for example, a combination of the BS transmit beam 305-A and the UE receive beam 310-A), which may be further refined and maintained in accordance with one or more established beam refinement procedures.

A downlink beam, such as a BS transmit beam 305 or a UE receive beam 310, may be associated with a transmission configuration indication (TCI) state. A TCI state may indicate a directionality or a characteristic of the downlink beam, such as one or more QCL properties of the downlink beam. A QCL property may include, for example, a Doppler shift, a Doppler spread, an average delay, a delay spread, or spatial receive parameters, among other examples. In some examples, each BS transmit beam 305 may be associated with a synchronization signal block (SSB), and the UE 120 may indicate a preferred BS transmit beam 305 by transmitting uplink transmissions that are associated with the preferred BS transmit beam 305. A particular SSB may have an associated TCI state (for example, for an antenna port or for beamforming). The base station 110 may, in some examples, indicate a downlink BS transmit beam 305 based at least in part on antenna port QCL properties that may be indicated by the TCI state. A TCI state may be associated with one downlink reference signal set (for example, an SSB and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 310 at the UE 120. Thus, the UE 120 may select a corresponding UE receive beam 310 from a set of BPLs based at least in part on the base station 110 indicating a BS transmit beam 305 via a TCI indication.

A QCL type that indicates Doppler shift, Doppler spread, average delay, and delay spread may be referred to as QCL Type A (or QCL-TypeA). A QCL type that indicates Doppler shift and Doppler spread may be referred to as QCL Type B (or QCL-TypeB). A QCL type that indicates Doppler shift and average delay may be referred to as QCL Type C (or QCL-TypeC). A QCL type that indicates one or more spatial receive (RX) parameters may be referred to as QCL Type D (or QCL-TypeD).

The base station 110 may maintain a set of activated TCI states for downlink shared channel transmissions and a set of activated TCI states for downlink control channel transmissions. The set of activated TCI states for downlink shared channel transmissions may correspond to beams that the base station 110 uses for downlink transmission on a physical downlink shared channel (PDSCH). The set of activated TCI states for downlink control channel communications may correspond to beams that the base station 110 may use for downlink transmission on a physical downlink control channel (PDCCH) or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as a radio resource control (RRC) message.

The UE 120 may use a QCL assumption to determine a beam for receiving a downlink transmission on a PDSCH. The UE 120 may determine the QCL assumption based at least in part on an indication in downlink control information (DCI) that schedules the PDSCH. For example, the UE 120 may determine the QCL assumption based at least in part on a TCI state indicated in the DCI. In other cases, the UE 120 may determine the QCL assumption based at least in part on a default QCL assumption. For example, the UE 120 may use a default QCL assumption when a scheduling DCI does not indicate a TCI state, or when a scheduling offset (e.g., a time offset) between a scheduling DCI and a PDSCH scheduled by the DCI does not satisfy a threshold value (e.g., a time duration for QCL value).

Whether the UE 120 is to use a TCI state indicated in DCI to determine a QCL assumption for a PDSCH, or use a default QCL assumption for the PDSCH, may be based on several factors. For example, the QCL assumption that is to be used by the UE 120 may be based at least in part on whether QCL Type D is configured for PDSCH reception, whether a scheduling offset between reception of the DCI and the scheduled PDSCH satisfies a threshold value, or whether the CORESET that carries the DCI is configured for TCI indication in DCI (e.g., whether TCI being present in DCI is configured). Table 1 below indicates the QCL assumption that is to be used for a PDSCH in various scenarios when QCL Type D is configured for PDSCH reception:

TABLE 1

| | Scheduling offset < threshold value | Scheduling offset ≥ threshold value |
|---|---|---|
| TCI present in DCI | QCL of CORESET with lowest identifier | TCI state in DCI |
| TCI not present in DCI | QCL of CORESET with lowest identifier | QCL of CORESET of scheduling DCI |

Table 2 below indicates the QCL assumption that is to be used for a PDSCH in various scenarios when QCL Type D is not configured for PDSCH reception:

TABLE 2

| | Scheduling offset < threshold value | Scheduling offset ≥ threshold value |
|---|---|---|
| TCI present in DCI | TCI state in DCI | TCI state in DCI |
| TCI not present in DCI | QCL of CORESET with lowest identifier | QCL of CORESET of scheduling DCI |

For uplink communications, the UE 120 may transmit in the direction of the base station 110 using a directional UE transmit beam, and the base station 110 may receive the transmission using a directional BS receive beam. Each UE transmit beam may have an associated beam ID, beam direction, or beam symbols, among other examples. The UE 120 may transmit uplink communications via one or more UE transmit beams 315.

The base station 110 may receive uplink transmissions via one or more BS receive beams 320. The base station 110 may identify a particular UE transmit beam 315, shown as UE transmit beam 315-A, and a particular BS receive beam 320, shown as BS receive beam 320-A, that provide relatively favorable performance (for example, that have a best channel quality of the different measured combinations of UE transmit beams 315 and BS receive beams 320). In some examples, the base station 110 may transmit an indication of which UE transmit beam 315 is identified by the base station 110 as a preferred UE transmit beam, which the base station 110 may select for transmissions from the UE 120. The UE 120 and the base station 110 may thus attain and maintain a BPL for uplink communications (for example, a combination of the UE transmit beam 315-A and the BS receive beam 320-A), which may be further refined and maintained in accordance with one or more established beam refinement procedures. An uplink beam, such as a UE transmit beam 315 or a BS receive beam 320, may be associated with a spatial relation. A spatial relation may indicate a directionality or a characteristic of the uplink beam, similar to one or more QCL properties, as described above.

As indicated above, FIG. 3 is provided as an example. Other examples may differ from what is described with respect to FIG. 3.

Figure 4:
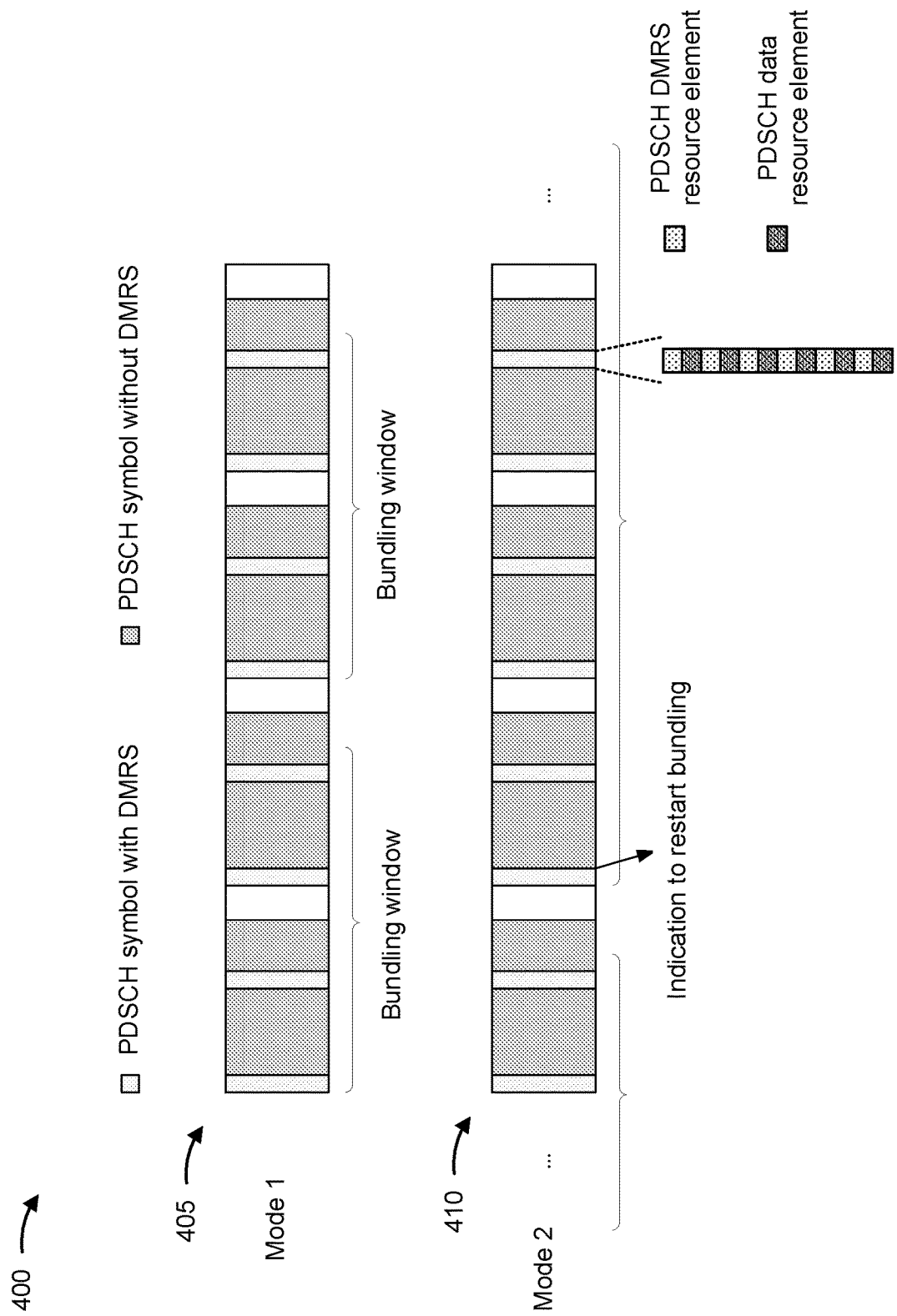
FIG. 4 is a diagram illustrating an example of demodulation reference signal (DMRS) bundling, in accordance with various aspects of the present disclosure.

FIG. 4 is a diagram illustrating an example 400 of demodulation reference signal (DMRS) bundling, in accordance with various aspects of the present disclosure.

A transmitter, such as a base station, may transmit one or more DMRSs to a receiver, such as a UE. A DMRS may include a reference signal that is generated from a base sequence, such as a Zadoff-Chu sequence or a Gold sequence. The UE may perform one or more measurements of the DMRS to estimate a physical channel on which one or more communications are transmitted from the base station. In this way, the UE may determine whether a channel quality of the physical channel satisfies one or more channel quality thresholds, and may use the results from the one or more measurements to facilitate demodulation of the communications transmitted on the physical channel.

In some cases, the base station may associate or bundle a plurality of time-domain resources (e.g., DMRS symbols) for purposes of DMRS bundling. DMRS bundling permits DMRS symbols for different PDSCH occasions to be transmitted with phase coherence. In this case, the UE may assume that the same precoder is used across the DMRS symbols and that DMRS transmissions across the DMRS symbols may be coherently processed (e.g., coherently combined, coherently filtered, and/or the like) to increase the accuracy of the channel estimation (e.g., by improving a quality of the DMRS).

As shown in FIG. 4, DMRS bundling may use a first mode (referred to as Mode 1) or a second mode (referred to as Mode 2). As an example, FIG. 4 shows PDSCH mapping Type B, a single-symbol DMRS, DMRS Type 1, and two symbols per PDSCH slot.

As shown by reference number 405, Mode 1 may use a periodic bundling window. In this case, all DMRS symbols in the bundling window may be bundled. The bundling window may include a configurable quantity of PDSCH occasions or a configurable quantity of slots, and thus, a DMRS bundle may include the DMRS transmissions in the DMRS symbols of the PDSCH occasions or within the slots.

As shown by reference number 410, Mode 2 may use dynamic indication (e.g., in a PDCCH) of a DMRS bundle boundary. For example, a base station may transmit, to a UE, an indication of when a new bundle starts or when an ongoing bundle ends (e.g., boundaries of a bundle are dynamically configured). In this case, all DMRS symbols from an indicated start of a bundle boundary to an indicated end of the bundle boundary may be bundled. That is, the indicated start of the bundle boundary and the indicated end of the bundle boundary may define a bundling window. Accordingly, different bundles may include different quantities of PDSCH occasions or different quantities of slots, according to dynamically indicated bundle boundaries.

As described above, a UE may coherently process DMRS transmissions in a DMRS bundle based on an assumption that phase continuity is maintained across the DMRS bundle. However, in some cases, different PDSCH occasions used for DMRS bundling may be associated with different beams, TCI states, QCL assumptions, and/or the like. In some cases, a UE may receive one or more other channels (e.g., a PDCCH, a CSI-RS, and/or the like) in between PDSCH occasions used for DMRS bundling, and the other channels may be associated with a different beam, TCI state, QCL assumption, and/or the like, than the PDSCH occasions. In such cases, phase continuity may not be maintained across the PDSCH occasions used for DMRS bundling.

Wireless networks generally lack support for techniques to indicate, configure, and/or determine whether phase continuity is maintained across PDSCH occasions that are to be used for DMRS bundling. Some techniques and apparatuses described herein enable determination of whether phase continuity is maintained across such PDSCH occasions. In particular, some techniques and apparatuses described herein enable determination of whether phase continuity is maintained across such PDSCH occasions when a QCL assumption changes in a bundling window. In this way, a UE may identify DMRS transmissions that are to be used for DMRS bundling with greater accuracy, thereby improving channel estimation.

As indicated above, FIG. 4 is provided as an example. Other examples may differ from what is described with respect to FIG. 4.

Figure 5:
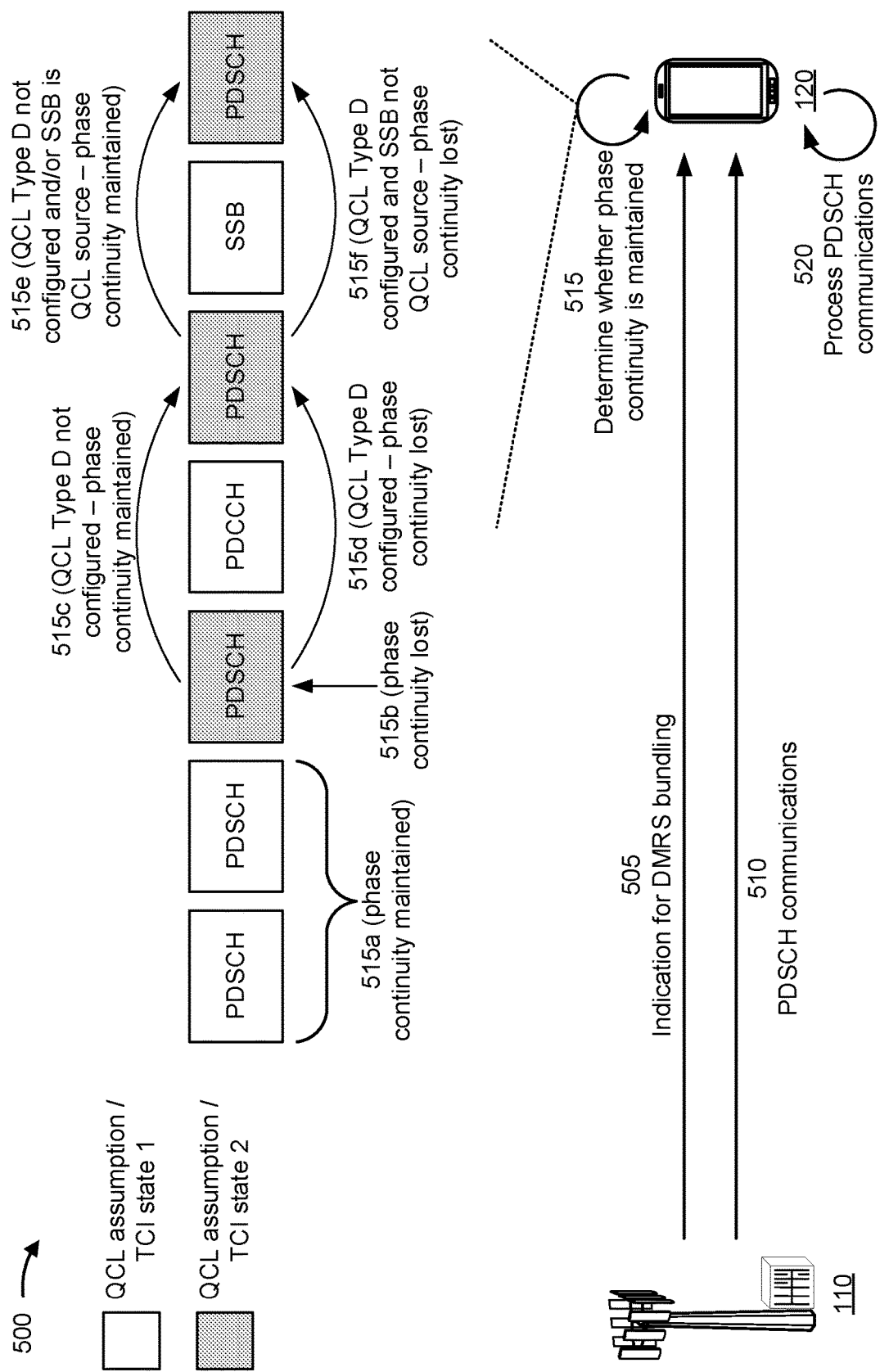
FIG. 5 is a diagram illustrating an example associated with phase continuity for DMRS bundling, in accordance with various aspects of the present disclosure.

FIG. 5 is a diagram illustrating an example 500 associated with phase continuity for DMRS bundling, in accordance with various aspects of the present disclosure. As shown in FIG. 5, a base station 110 and a UE 120 may communicate with one another. While the example 500 is described in terms of QCL assumptions, the example 500 may apply equally to other beam indications, such as TCI states.

As shown by reference number 505, the base station 110 may transmit, and the UE 120 may receive, an indication for DMRS bundling. For example, the base station 110 may transmit an indication that a plurality of PDSCH communications are associated (e.g., time resources, such as DMRS symbols, in PDSCH occasions for the plurality of PDSCH communications are associated) for purposes of DMRS bundling. In some aspects, the indication may be a configuration (e.g., an RRC configuration) for Mode 1 DMRS bundling. In this case, the indication may identify a bundling window for DMRS bundling, and the bundling window may include the plurality of PDSCH communications. In some aspects, the indication (e.g., in DCI) may be a configuration for Mode 2 DMRS bundling. In this case, the indication may identify a starting boundary for DMRS bundling, and the PDSCH communications may begin at or after the starting boundary. For example, the indication may identify a time resource (e.g., a symbol) in which DMRS bundling is to be initiated or is to be reset. The time period for DMRS bundling beginning at the starting boundary may also be referred to herein as a bundling window.

In some aspects, the indication (e.g., configuration) for DMRS bundling is without regard to whether there is a change in a QCL assumption for communications received by the UE 120. For example, the indication that the plurality of PDSCH communications are associated for purposes of DMRS bundling is without regard to whether there is a change in a QCL assumption (e.g., there are no restrictions on a configuration for DMRS bundling). In other words, the bundling window identified by the indication for DMRS bundling is not based on a recent change in a QCL assumption or whether a QCL assumption is to change during the bundling window. In this case, the UE 120 may determine whether phase continuity is maintained across the bundling window after a change in a QCL assumption (e.g., whether to reset DMRS bundling after the change in the QCL assumption) in accordance with one or more rules, as described below.

In some aspects, the indication (e.g., configuration) for DMRS bundling is with regard to whether there is a change in a QCL assumption for communications received by the UE 120. For example, the indication that the plurality of PDSCH communications are associated for purposes of DMRS bundling is with regard to whether there is a change in a QCL assumption (e.g., there are restrictions on a configuration for DMRS bundling). In other words, the bundling window identified by the indication for DMRS bundling is aligned with a recent change in a QCL assumption. For example, the indication for DMRS bundling (e.g., indicating a start of a new bundling window) may coincide with a change in a QCL assumption (e.g., according to a change to a TCI state). That is, the indication for DMRS bundling may indicate a reset in DMRS bundling based at least in part on a change in a QCL assumption. Accordingly, the UE 120 may not expect a change in a QCL assumption to occur within a bundling window, but may expect a change in a QCL assumption to occur at the beginning of a bundling window. In this case, the UE 120 may determine that phase continuity is maintained across a bundling window that is reset after a change in a QCL assumption.

In some aspects, the base station 110 may transmit one or more other indications in addition to the indication for DMRS bundling (e.g., before the indication for DMRS bundling or after the indication for DMRS bundling). For example, the base station 110 may transmit, and the UE 120 may receive, an indication of whether a QCL type associated with a spatial receive parameter (e.g., QCL Type D) is enabled for PDSCH reception. For example, the base station 110 may transmit a PDSCH configuration that indicates whether QCL Type D is configured for PDSCH reception.

As shown by reference number 510, the base station 110 may transmit, and the UE 120 may receive, the plurality of PDSCH communications. For example, the base station 110 may transmit the plurality of PDSCH communications over a bundling window. As described above in connection with FIG. 4, a PDSCH communication may include a DMRS transmission in one or more symbols, and the plurality of PDSCH communications, over the bundling window, may include DMRS transmissions that are to be bundled. A PDSCH communication may also include data in one or more symbols (one or more of which may be shared with DMRSs).

In some aspects, the plurality of PDSCH communications may be dynamically scheduled by the base station in resources (e.g., PDSCH occasions) of the bundling window. For example, the base station may transmit separate DCIs that schedule each of the plurality of PDSCH communications. In this case, a DCI may indicate a TCI state for a PDSCH communication, or the PDSCH communication may use a default QCL assumption. In some aspects, the default QCL assumption for a PDSCH communication may be based at least in part on a QCL assumption for a preceding (e.g., immediately preceding) PDSCH communication (e.g., rather than the default QCL assumption being adopted by the base station and based on a CORESET). However, the default QCL assumption for a first PDSCH communication in a bundling window may be based at least in part on a CORESET (e.g., as indicated above in Tables 1 and 2).

In some aspects, the plurality of PDSCH communications may be PDSCH repetitions. In this case, the base station may transmit a single DCI that schedules the repetitions of the same PDSCH payload. The single DCI may indicate a TCI state for all of the repetitions, or the repetitions may use a default QCL assumption. In some aspects, the plurality of PDSCH communications may be scheduled by semi-persistent scheduling (SPS). In this case, the base station may transmit DCI that activates the SPS. The DCI may indicate a QCL assumption (e.g., QCL properties) for the PDSCH occasions of the SPS, or the PDSCH occasions of the SPS may use a default QCL assumption. In some aspects, the bundling window may correspond to a duration of the repetitions or a duration of the SPS (e.g., the bundling window may be implicit, and may not be identified in the indication for DMRS bundling, as described above).

As shown by reference number 515, the UE 120 may determine whether phase continuity is maintained for the plurality of PDSCH communications in the bundling window. For example, the UE 120 may determine whether phase continuity is maintained based at least in part on respective QCL assumptions (e.g., respective QCL properties) for the plurality of PDSCH communications. In some aspects, the UE 120 may determine whether phase continuity is maintained based at least in part on respective beam indications, respective TCI states, respective beams, and/or the like, for the plurality of PDSCH communications, in a manner similar to that described below.

In some aspects, the respective QCL assumptions for the plurality of PDSCH communications in the bundling window are the same QCL assumption. For example, the bundling of PDSCH communications may be per TCI state. In some aspects, phase continuity is maintained for multiple PDSCH communications, of the plurality of PDSCH communications, if the QCL assumptions for the multiple PDSCH communications are the same QCL assumption (e.g., if respective TCI states for the multiple PDSCH communications are the same TCI state).

In some aspects, the UE 120 may be capable of using only a single TCI state for communications, and phase continuity is maintained for multiple PDSCH communications, of the plurality of PDSCH communications, if a TCI state used by the UE 120 is not changed during a duration of the multiple PDSCH communications (e.g., provided the UE 120 does not receive a synchronization signal block (SSB) or another initial access communication during a duration of the multiple PDSCH communications). In some aspects, the phase continuity is maintained, provided the TCI state is not changed, even if the UE 120 receives another communication, such as a PDCCH communication, a CSI-RS communication, and/or the like, during a duration of the multiple PDSCH communications (e.g., because the UE 120 will receive the other communication using the single TCI state).

Accordingly, as shown by reference number 515*a*, the UE 120 may determine that the phase continuity is maintained for multiple PDSCH communications, of the plurality of PDSCH communications, based at least in part on a determination that the QCL assumptions for the multiple PDSCH communications are the same (e.g., based at least in part on a determination that the TCI states for the multiple PDSCH communications are the same).

In some aspects, phase continuity is not maintained for the plurality of PDSCH communications in the bundling window if at least a first and a second PDSCH communication, of the plurality of PDSCH communications, are associated with different QCL assumptions (e.g., associated with different TCI states). In other words, if a QCL assumption (e.g., associated with QCL Type A, QCL Type B, QCL Type C, and/or QCL Type D) changes at a PDSCH communication in the bundling window phase continuity is lost. Accordingly, as shown by reference number 515*b*, the UE 120 may determine that the phase continuity is not maintained between one or more first PDSCH communications and one or more second PDSCH communications, of the plurality of PDSCH communications in the bundling window, associated with different QCL assumptions.

In some aspects, the base station 110 may transmit, and the UE 120 may receive, one or more other communications (which may be referred to herein as intervening communications) in the bundling window between first and second PDSCH communications, of the plurality of PDSCH communications, and the one or more other communications may be associated with a different QCL assumption than the first and second PDSCH communications. This may be referred to herein as an intervening QCL change scenario. In some aspects, in an intervening QCL change scenario, whether phase continuity is maintained between the first and second PDSCH communications may be based at least in part on whether phase continuity is maintained at the base station 110 when transmitting the first and second PDSCH communications and maintained at the UE 120 when receiving the first and second PDSCH communications. For example, phase continuity can be maintained if communication hardware (e.g., antenna panels) used to transmit/receive the first and second PDSCH communications is different from communication hardware used to transmit/receive an intervening communication.

In some aspects, the one or more other communications are one or more of a PDCCH communication, a CSI-RS communication, an additional PDSCH communication, or another non-SSB communication. In some aspects, in an intervening QCL change scenario involving a PDCCH, a CSI-RS, and/or an additional PDSCH, phase continuity is maintained between the first and second PDSCH communications if a QCL type associated with a spatial receive parameter (e.g., QCL Type D) is not configured for the UE 120 for PDSCH reception. That is, the phase continuity is maintained even if an intervening PDCCH, CSI-RS, and/or other PDSCH, between the first and second PDSCH communications, has a different QCL assumption (e.g., associated with QCL Type A, QCL Type B, or QCL Type C) than the first and second PDSCH communications. Accordingly, as shown by reference number 515*c*, in an intervening QCL change scenario involving a PDCCH, a CSI-RS, and/or an additional PDSCH, the UE 120 may determine that the phase continuity is maintained between the first and second PDSCH communications based at least in part on a determination that a QCL type associated with a spatial receive parameter (e.g., QCL Type D) is not configured for the UE 120 for PDSCH reception.

In some aspects, in an intervening QCL change scenario involving a PDCCH, a CSI-RS, and/or an additional PDSCH, phase continuity is not maintained between the first and second PDSCH communications if a QCL type associated with a spatial receive parameter (e.g., QCL Type D) is configured for the UE 120 for PDSCH reception. That is, the phase continuity is not maintained when an intervening PDCCH, CSI-RS, and/or other PDSCH, between the first and second PDSCH communications, has a different QCL assumption than the first and second PDSCH communications. In this case, the different QCL assumption may be associated with QCL Type D, or may be associated with QCL Type A, QCL Type B, or QCL Type C (e.g., provided that QCL properties associated with QCL Type A, QCL Type B, and QCL Type C change when a spatial receive parameter changes). Accordingly, as shown by reference number 515*d*, in an intervening QCL change scenario involving a PDCCH, a CSI-RS, and/or an additional PDSCH, the UE 120 may determine that the phase continuity is not maintained between the first and second PDSCH communications based at least in part on a determination that a QCL type associated with a spatial receive parameter (e.g., QCL Type D) is configured for the UE 120 for PDSCH reception.

In some aspects, the one or more other communications are one or more SSB communications. In some aspects, in an intervening QCL change scenario involving an SSB, phase continuity is maintained between the first and second PDSCH communications if a QCL type associated with a spatial receive parameter (e.g., QCL Type D) is not configured for the UE 120 for PDSCH reception. That is, the phase continuity is maintained even if an intervening SSB, between the first and second PDSCH communications, has a different QCL assumption (e.g., associated with QCL Type A, QCL Type B, or QCL Type C) than the first and second PDSCH communications. Accordingly, as shown by reference number 515*e*, in an intervening QCL change scenario involving an SSB, the UE 120 may determine that the phase continuity is maintained between the first and second PDSCH communications based at least in part on a determination that a QCL type associated with a spatial receive parameter (e.g., QCL Type D) is not configured for the UE 120 for PDSCH reception.

In some aspects, in an intervening QCL change scenario involving an SSB, phase continuity is maintained between the first and second PDSCH communications if a QCL type associated with a spatial receive parameter (e.g., QCL Type D) is configured for the UE 120 for PDSCH reception, and if the SSB is the QCL source (e.g., the direct QCL source, such as when a TCI state indicates SSB as the QCL source) for the first and/or second PDSCH communications. That is, the phase continuity is maintained even if an intervening SSB, between the first and second PDSCH communications, has a different QCL assumption than the first and second PDSCH communications. Accordingly, as also shown by reference number 515*e*, in an intervening QCL change scenario involving an SSB, the UE 120 may determine that the phase continuity is maintained between the first and second PDSCH communications based at least in part on a determination that a QCL type associated with a spatial receive parameter (e.g., QCL Type D) is configured for the UE 120 for PDSCH reception, and that the SSB is the QCL source for the first and/or second PDSCH communications.

In some aspects, in an intervening QCL change scenario involving an SSB, phase continuity is not maintained between the first and second PDSCH communications if a QCL type associated with a spatial receive parameter (e.g., QCL Type D) is configured for the UE 120 for PDSCH reception, and if the SSB is not the QCL source (e.g., the direct QCL source) for the first and second PDSCH communications. That is, the phase continuity is not maintained when an intervening SSB, between the first and second PDSCH communications, has a different QCL assumption than the first and second PDSCH communications. Accordingly, as shown by reference number 515*f*, in an intervening QCL change scenario involving an SSB, the UE 120 may determine that the phase continuity is not maintained between the first and second PDSCH communications based at least in part on a determination that a QCL type associated with a spatial receive parameter (e.g., QCL Type D) is configured for the UE 120 for PDSCH reception, and that the SSB is not the QCL source for the first and second PDSCH communications.

As described above, the plurality of PDSCH communications may be periodic communications, such as repetitions, SPS communications, and/or the like. In some aspects, phase continuity is maintained for the plurality of PDSCH communications (e.g., periodic communications) if the UE 120 does not receive, from the base station 110, another communication (e.g., another channel, such as an SSB, PDCCH, CSI-RS, and/or the like) during a duration of the plurality of PDSCH communications. Accordingly, the UE 120 may determine that phase continuity is maintained between one or more first PDSCH communications and one or more second PDSCH communications, of the plurality of PDSCH communications (e.g., periodic communications), based at least in part on a determination that another communication is not received between the one or more first PDSCH communications and the one or more second PDSCH communications.

In some aspects, phase continuity is maintained for the plurality of PDSCH communication (e.g., periodic communications) if the UE 120 receives, from the base station 110, another communication (e.g., another channel, such as an SSB, PDCCH, CSI-RS, and/or the like) during a duration of the plurality of PDSCH communications, and the other communication has the same QCL assumption as the plurality of PDSCH communications. Accordingly, the UE 120 may determine that phase continuity is maintained between one or more first PDSCH communications and one or more second PDSCH communications, of the plurality of PDSCH communications (e.g., periodic communications), based at least in part on a determination that another communication, associated with a same QCL assumption as the plurality of PDSCH communications, is received between the one or more first PDSCH communications and the one or more second PDSCH communications. If the other communication has a different QCL assumption than the plurality of PDSCH communications, then the UE 120 may determine whether phase continuity is maintained as described above (e.g., in an intervening QCL change scenario).

In some aspects, the UE 120 may determine whether phase continuity is maintained based at least in part on signaling between the base station 110 and the UE 120. In some aspects, the base station 110 may transmit (e.g., in an RRC message, a medium access control control element (MAC-CE) message, a PDCCH message, and/or the like), and the UE 120 may receive, an indication of whether phase continuity is to be maintained following a change in a QCL assumption during a duration of the plurality of PDSCH communications (e.g., in an intervening QCL change scenario). In some aspects, the UE 120 may transmit (e.g., in a UE capability message, a UE assistance information message, and/or the like), and the base station 110 may receive, an indication of whether phase continuity is to be maintained following a change in a QCL assumption during a duration of the plurality of PDSCH communications. For example, the base station 110 and the UE 120 may communicate information that indicates the situations in which a change in a QCL assumption is to result in a loss of downlink phase continuity at the base station 110 and/or at the UE 120.

In some aspects, the base station 110 and/or the UE 120 may transmit an indication of whether phase continuity is to be maintained in an intervening QCL change scenario, involving a PDCCH, a CSI-RS, or an additional PDSCH, for a change in a QCL assumption associated with QCL Type A, QCL Type B, and/or QCL Type C. In some aspects, the base station 110 and/or the UE 120 may transmit an indication of whether phase continuity is to be maintained in an intervening QCL change scenario, involving a PDCCH, a CSI-RS, or an additional PDSCH, for a change in a QCL assumption associated with QCL Type D.

In some aspects, the base station 110 may determine whether phase continuity is maintained for the plurality of PDSCH communications in the bundling window in a manner similar to that described above for the UE 120. In some aspects, the base station 110 may transmit the plurality of PDSCH communications based at least in part on determining whether the phase continuity is maintained.

As shown by reference number 520, the UE 120 may process the plurality of PDSCH communications based at least in part on determining whether phase continuity is maintained for the plurality of PDSCH communications. In some aspects, the UE 120 may determine to bundle DMRSs from multiple PDSCH communications for which phase continuity was determined to be maintained. In this case, the UE 120 may coherently process the DMRSs from the multiple PDSCH communications for which phase continuity was determined to be maintained. In some aspects, the UE 120 may determine not to bundle DMRSs from multiple PDSCH communications for which phase continuity was determined not to be maintained. In this case, the UE 120 may not coherently process (e.g., the UE 120 may individually process) the DMRSs from multiple PDSCH communications for which phase continuity was determined not to be maintained. In this way, a UE may identify DMRS transmissions that are to be used for DMRS bundling with greater accuracy, thereby improving channel estimation.

As indicated above, FIG. 5 is provided as an example. Other examples may differ from what is described with respect to FIG. 5.

Figure 6:
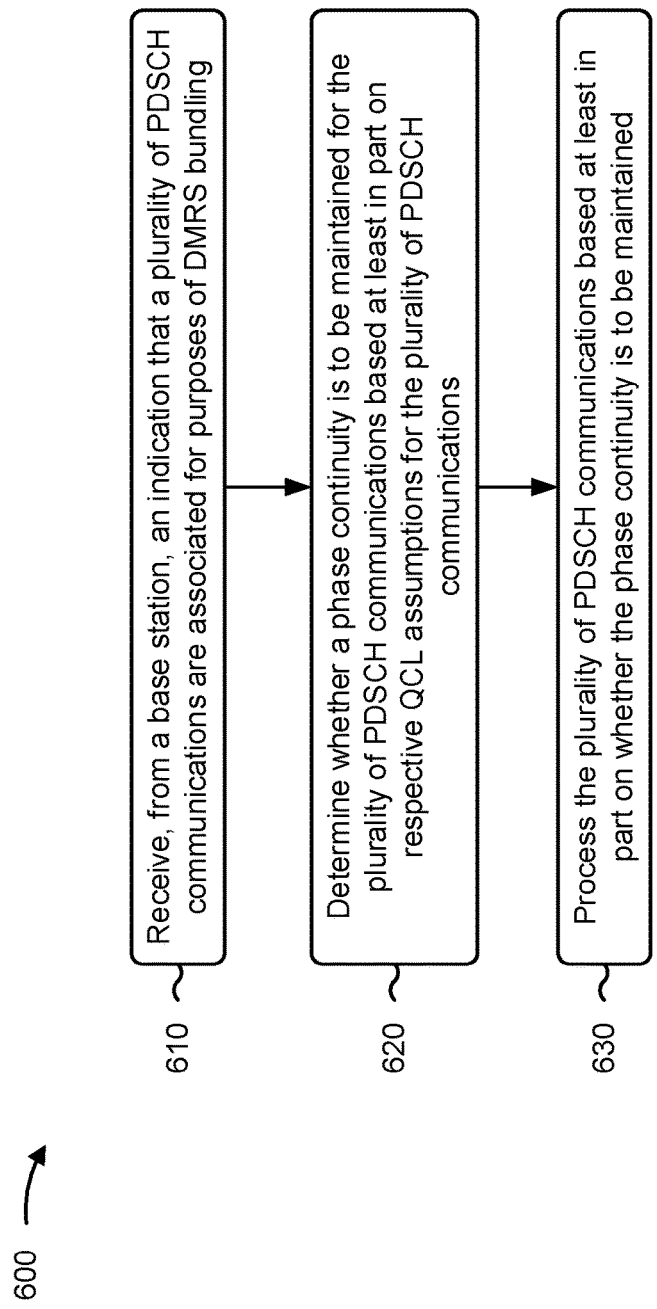
FIGS. 6 and 7 are diagrams illustrating example processes associated with phase continuity for DMRS bundling, in accordance with various aspects of the present disclosure.

FIG. 6 is a diagram illustrating an example process 600 performed, for example, by a UE, in accordance with various aspects of the present disclosure. Example process 600 is an example where the UE (e.g., UE 120) performs operations associated with phase continuity for DMRS bundling.

As shown in FIG. 6, in some aspects, process 600 may include receiving, from a base station, an indication that a plurality of PDSCH communications are associated for purposes of DMRS bundling (block 610). For example, the UE (e.g., using antenna 252, demodulator 254, MIMO detector 256, receive processor 258, controller/processor 280, and/or memory 282) may receive, from a base station, an indication that a plurality of PDSCH communications are associated for purposes of DMRS bundling, as described above.

As further shown in FIG. 6, in some aspects, process 600 may include determining whether a phase continuity is to be maintained for the plurality of PDSCH communications based at least in part on respective QCL assumptions for the plurality of PDSCH communications (block 620). For example, the UE (e.g., using controller/processor 280, memory 282, and/or the like) may determine whether a phase continuity is to be maintained for the plurality of PDSCH communications based at least in part on respective QCL assumptions for the plurality of PDSCH communications, as described above.

As further shown in FIG. 6, in some aspects, process 600 may include processing the plurality of PDSCH communications based at least in part on whether the phase continuity is to be maintained (block 630). For example, the UE (e.g., using controller/processor 280, memory 282, and/or the like) may process the plurality of PDSCH communications based at least in part on whether the phase continuity is to be maintained, as described above.

Process 600 may include additional aspects, such as any single aspect or any combination of aspects described below and/or in connection with one or more other processes described elsewhere herein.

In a first aspect, the phase continuity is determined to be maintained for the plurality of PDSCH communications based at least in part on a determination that the respective QCL assumptions are the same.

In a second aspect, alone or in combination with the first aspect, the phase continuity is determined not to be maintained between one or more first PDSCH communications and one or more second PDSCH communications, of the plurality of PDSCH communications, associated with different QCL assumptions.

In a third aspect, alone or in combination with one or more of the first and second aspects, the phase continuity is determined to be maintained for the plurality of PDSCH communications based at least in part on a determination that respective TCI states, for the plurality of PDSCH communications, are the same.

In a fourth aspect, alone or in combination with one or more of the first through third aspects, the UE is capable of using a single TCI state for communication, and the phase continuity is determined to be maintained for the plurality of PDSCH communications based at least in part on a determination that the single TCI state is not changed during a duration of the plurality of PDSCH communications.

In a fifth aspect, alone or in combination with one or more of the first through fourth aspects, process 600 includes receiving (e.g., using antenna 252, DEMOD 254, MIMO detector 256, receive processor 258, controller/processor 280, and/or the like) a communication between one or more first PDSCH communications and one or more second PDSCH communications of the plurality of PDSCH communications, and the communication is associated with a QCL assumption that is different from the respective QCL assumptions for the plurality of PDSCH communications.

In a sixth aspect, alone or in combination with one or more of the first through fifth aspects, the communication is a PDCCH, a CSI-RS communication, or an additional PDSCH communication.

In a seventh aspect, alone or in combination with one or more of the first through sixth aspects, the phase continuity is determined to be maintained between the one or more first PDSCH communications and the one or more second PDSCH communications based at least in part on a determination that a QCL type associated with a spatial receive parameter is not configured for PDSCH reception.

In an eighth aspect, alone or in combination with one or more of the first through seventh aspects, the phase continuity is determined not to be maintained between the one or more first PDSCH communications and the one or more second PDSCH communications based at least in part on a determination that a QCL type associated with a spatial receive parameter is configured for PDSCH reception.

In a ninth aspect, alone or in combination with one or more of the first through eighth aspects, the communication is an SSB communication.

In a tenth aspect, alone or in combination with one or more of the first through ninth aspects, the phase continuity is determined to be maintained between the one or more first PDSCH communications and the one or more second PDSCH communications based at least in part on a determination that a QCL type associated with a spatial receive parameter is not configured for PDSCH reception.

In an eleventh aspect, alone or in combination with one or more of the first through tenth aspects, the phase continuity is determined to be maintained between the one or more first PDSCH communications and the one or more second PDSCH communications based at least in part on a determination that a QCL type associated with a spatial receive parameter is configured for PDSCH reception, and that the SSB is a QCL source for the one or more first PDSCH communications and the one or more second PDSCH communications.

In a twelfth aspect, alone or in combination with one or more of the first through eleventh aspects, the phase continuity is determined not to be maintained between the one or more first PDSCH communications and the one or more second PDSCH communications based at least in part on a determination that a QCL type associated with a spatial receive parameter is configured for PDSCH reception, and that the SSB is not a QCL source for the one or more first PDSCH communications and the one or more second PDSCH communications.

In a thirteenth aspect, alone or in combination with one or more of the first through twelfth aspects, the plurality of PDSCH communications are repetitions or are scheduled by SPS.

In a fourteenth aspect, alone or in combination with one or more of the first through thirteenth aspects, the phase continuity is determined to be maintained between one or more first PDSCH communications and one or more second PDSCH communications, of the plurality of PDSCH communications, based at least in part on a determination that another communication is not received between the one or more first PDSCH communications and the one or more second PDSCH communications.

In a fifteenth aspect, alone or in combination with one or more of the first through fourteenth aspects, the phase continuity is determined to be maintained between one or more first PDSCH communications and one or more second PDSCH communications, of the plurality of PDSCH communications, based at least in part on a determination that another communication, associated with a same QCL assumption as the respective QCL assumptions of the plurality of PDSCH communications, is received between the one or more first PDSCH communications and the one or more second PDSCH communications.

In a sixteenth aspect, alone or in combination with one or more of the first through fifteenth aspects, a bundling window for the DMRS bundling corresponds to a duration of the repetitions or a duration of the SPS.

In a seventeenth aspect, alone or in combination with one or more of the first through sixteenth aspects, process 600 includes transmitting (e.g., using controller/processor 280, transmit processor 264, TX MIMO processor 266, MOD 254, antenna 252, and/or the like) or receiving (e.g., using antenna 252, DEMOD 254, MIMO detector 256, receive processor 258, controller/processor 280, and/or the like) an indication of whether phase continuity is to be maintained following a change in a QCL assumption during a duration of the plurality of PDSCH communications.

In an eighteenth aspect, alone or in combination with one or more of the first through seventeenth aspects, the indication that the plurality of PDSCH communications are associated for purposes of DMRS bundling is without regard to whether there is a change in a QCL assumption for communications received by the UE.

In a nineteenth aspect, alone or in combination with one or more of the first through eighteenth aspects, determining whether the phase continuity is maintained for the plurality of PDSCH communications is based at least in part on one or more rules.

In a twentieth aspect, alone or in combination with one or more of the first through nineteenth aspects, the indication that the plurality of PDSCH communications are associated for purposes of DMRS bundling is with regard to whether there is a change in a QCL assumption for communications received by the UE.

In a twenty-first aspect, alone or in combination with one or more of the first through twentieth aspects, the indication indicates a reset for associating the plurality of PDSCH communications for purposes of the DMRS bundling when there is a change in a QCL assumption for communications received by the UE.

In a twenty-second aspect, alone or in combination with one or more of the first through twenty-first aspects, a first PDSCH communication, of the plurality of PDSCH communications, is associated with a change in a QCL assumption relative to a previous communication.

In a twenty-third aspect, alone or in combination with one or more of the first through twenty-second aspects, a default QCL assumption for a PDSCH communication, of the plurality of PDSCH communications, is based at least in part on a QCL assumption for a preceding PDSCH communication of the plurality of PDSCH communications.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
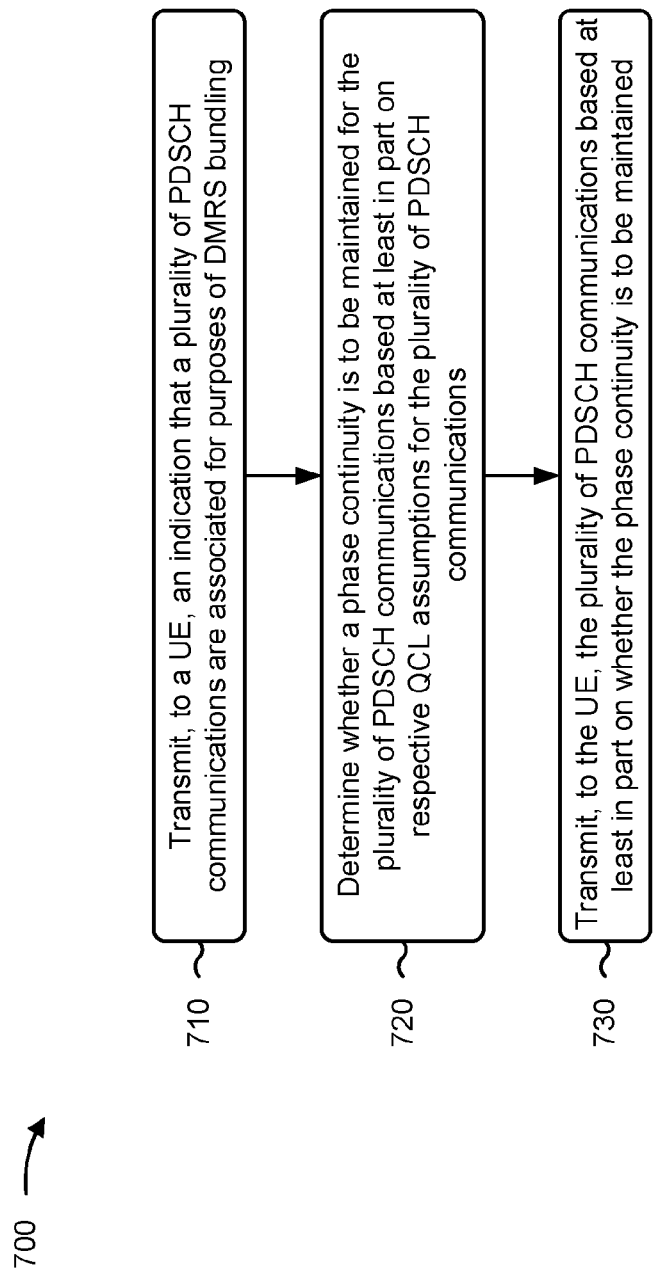

FIG. 7 is a diagram illustrating an example process 700 performed, for example, by a base station, in accordance with various aspects of the present disclosure. Example process 700 is an example where the base station (e.g., base station 110) performs operations associated with phase continuity for DMRS bundling.

As shown in FIG. 7, in some aspects, process 700 may include transmitting, to a UE, an indication that a plurality of PDSCH communications are associated for purposes of DMRS bundling (block 710). For example, the base station (e.g., using transmit processor 220, TX MIMO processor 230, modulator 232, antenna 234, controller/processor 240, memory 242, and/or scheduler 246) may transmit, to a UE, an indication that a plurality of PDSCH communications are associated for purposes of DMRS bundling, as described above.

As further shown in FIG. 7, in some aspects, process 700 may include determining whether a phase continuity is to be maintained for the plurality of PDSCH communications based at least in part on respective QCL assumptions for the plurality of PDSCH communications (block 720). For example, the base station (e.g., using controller/processor 240, memory 242, and/or the like) may determine whether a phase continuity is to be maintained for the plurality of PDSCH communications based at least in part on respective QCL assumptions for the plurality of PDSCH communications, as described above.

As further shown in FIG. 7, in some aspects, process 700 may include transmitting, to the UE, the plurality of PDSCH communications based at least in part on whether the phase continuity is to be maintained (block 730). For example, the base station (e.g., using transmit processor 220, TX MIMO processor 230, modulator 232, antenna 234, controller/processor 240, memory 242, and/or scheduler 246) may transmit, to the UE, the plurality of PDSCH communications based at least in part on whether the phase continuity is to be maintained, as described above.

Process 700 may include additional aspects, such as any single aspect or any combination of aspects described below and/or in connection with one or more other processes described elsewhere herein.

In a first aspect, the phase continuity is determined to be maintained for the plurality of PDSCH communications based at least in part on a determination that the respective QCL assumptions are the same.

In a second aspect, alone or in combination with the first aspect, the phase continuity is determined not to be maintained between one or more first PDSCH communications and one or more second PDSCH communications, of the plurality of PDSCH communications, associated with different QCL assumptions.

In a third aspect, alone or in combination with one or more of the first and second aspects, the phase continuity is determined to be maintained for the plurality of PDSCH communications based at least in part on a determination that respective TCI states, for the plurality of PDSCH communications, are the same.

In a fourth aspect, alone or in combination with one or more of the first through third aspects, the UE is capable of using a single TCI state for communication, and the phase continuity is determined to be maintained for the plurality of PDSCH communications based at least in part on a determination that the single TCI state is not changed during a duration of the plurality of PDSCH communications.

In a fifth aspect, alone or in combination with one or more of the first through fourth aspects, process 700 includes transmitting (e.g., using controller/processor 240, transmit processor 220, TX MIMO processor 230, MOD 232, antenna 234, and/or the like) a communication between one or more first PDSCH communications and one or more second PDSCH communications of the plurality of PDSCH communications, and the communication is associated with a QCL assumption that is different from the respective QCL assumptions for the plurality of PDSCH communications.

In a sixth aspect, alone or in combination with one or more of the first through fifth aspects, the communication is a PDCCH communication, a CSI-RS communication, or an additional PDSCH communication.

In a seventh aspect, alone or in combination with one or more of the first through sixth aspects, the phase continuity is determined to be maintained between the one or more first PDSCH communications and the one or more second PDSCH communications based at least in part on a determination that a QCL type associated with a spatial receive parameter is not configured for PDSCH reception.

In an eighth aspect, alone or in combination with one or more of the first through seventh aspects, the phase continuity is determined not to be maintained between the one or more first PDSCH communications and the one or more second PDSCH communications based at least in part on a determination that a QCL type associated with a spatial receive parameter is configured for PDSCH reception.

In a ninth aspect, alone or in combination with one or more of the first through eighth aspects, the communication is an SSB communication.

In a tenth aspect, alone or in combination with one or more of the first through ninth aspects, the phase continuity is determined to be maintained between the one or more first PDSCH communications and the one or more second PDSCH communications based at least in part on a determination that a QCL type associated with a spatial receive parameter is not configured for PDSCH reception.

In an eleventh aspect, alone or in combination with one or more of the first through tenth aspects, the phase continuity is determined to be maintained between the one or more first PDSCH communications and the one or more second PDSCH communications based at least in part on a determination that a QCL type associated with a spatial receive parameter is configured for PDSCH reception, and that the SSB is a QCL source for the one or more first PDSCH communications and the one or more second PDSCH communications.

In a twelfth aspect, alone or in combination with one or more of the first through eleventh aspects, the phase continuity is determined not to be maintained between the one or more first PDSCH communications and the one or more second PDSCH communications based at least in part on a determination that a QCL type associated with a spatial receive parameter is configured for PDSCH reception, and that the SSB is not a QCL source for the one or more first PDSCH communications and the one or more second PDSCH communications.

In a thirteenth aspect, alone or in combination with one or more of the first through twelfth aspects, the plurality of PDSCH communications are repetitions or are scheduled by SPS.

In a fourteenth aspect, alone or in combination with one or more of the first through thirteenth aspects, the phase continuity is determined to be maintained between one or more first PDSCH communications and one or more second PDSCH communications, of the plurality of PDSCH communications, based at least in part on a determination that another communication is not transmitted between the one or more first PDSCH communications and the one or more second PDSCH communications.

In a fifteenth aspect, alone or in combination with one or more of the first through fourteenth aspects, the phase continuity is determined to be maintained between one or more first PDSCH communications and one or more second PDSCH communications, of the plurality of PDSCH communications, based at least in part on a determination that another communication, associated with a same QCL assumption as the respective QCL assumptions of the plurality of PDSCH communications, is transmitted between the one or more first PDSCH communications and the one or more second PDSCH communications.

In a sixteenth aspect, alone or in combination with one or more of the first through fifteenth aspects, a bundling window for the DMRS bundling corresponds to a duration of the repetitions or a duration of the semi-persistent scheduling.

In a seventeenth aspect, alone or in combination with one or more of the first through sixteenth aspects, process 700 includes transmitting (e.g., using controller/processor 240, transmit processor 220, TX MIMO processor 230, MOD 232, antenna 234, and/or the like) or receiving (e.g., using antenna 234, DEMOD 232, MIMO detector 236, receive processor 238, controller/processor 240, and/or the like) an indication of whether phase continuity is to be maintained following a change in a QCL assumption during a duration of the plurality of PDSCH communications.

In an eighteenth aspect, alone or in combination with one or more of the first through seventeenth aspects, the indication that the plurality of PDSCH communications are associated for purposes of DMRS bundling is without regard to whether there is a change in a QCL assumption for communications transmitted to the UE.

In a nineteenth aspect, alone or in combination with one or more of the first through eighteenth aspects, determining whether the phase continuity is maintained for the plurality of PDSCH communications is based at least in part on one or more rules.

In a twentieth aspect, alone or in combination with one or more of the first through nineteenth aspects, the indication that the plurality of PDSCH communications are associated for purposes of DMRS bundling is with regard to whether there is a change in a QCL assumption for communications transmitted to the UE.

In a twenty-first aspect, alone or in combination with one or more of the first through twentieth aspects, the indication indicates a reset for associating the plurality of PDSCH communications for purposes of the DMRS bundling when there is a change in a QCL assumption for communications transmitted to the UE.

In a twenty-second aspect, alone or in combination with one or more of the first through twenty-first aspects, a first PDSCH communication, of the plurality of PDSCH communications, is associated with a change in a QCL assumption relative to a previous communication.

In a twenty-third aspect, alone or in combination with one or more of the first through twenty-second aspects, a default QCL assumption for a PDSCH communication, of the plurality of PDSCH communications, is based at least in part on a QCL assumption for a preceding PDSCH communication of the plurality of PDSCH communications.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving, from a base station, an indication that a plurality of physical downlink shared channel (PDSCH) communications are associated for purposes of demodulation reference signal (DMRS) bundling;
   determining whether a phase continuity is to be maintained for the plurality of PDSCH communications based at least in part on respective quasi-co-location (QCL) assumptions for the plurality of PDSCH communications; and
   processing the plurality of PDSCH communications based at least in part on whether the phase continuity is to be maintained.

2. The method of claim 1, wherein the phase continuity is determined to be maintained for the plurality of PDSCH communications based at least in part on a determination that the respective QCL assumptions are the same.

3. The method of claim 1, wherein the phase continuity is determined to be maintained for the plurality of PDSCH communications based at least in part on a determination that respective transmission configuration indicator states, for the plurality of PDSCH communications, are the same.

4. The method of claim 1, wherein the UE is capable of using a single transmission configuration indicator (TCI) state for communication, and
   wherein the phase continuity is determined to be maintained for the plurality of PDSCH communications based at least in part on a determination that the single TCI state is not changed during a duration of the plurality of PDSCH communications.

5. The method of claim 1, further comprising:
   receiving a communication between one or more first PDSCH communications and one or more second PDSCH communications of the plurality of PDSCH communications,
      wherein the communication is a physical downlink control channel communication, a channel state information reference signal communication, or an additional PDSCH communication,
      wherein the communication is associated with a QCL assumption that is different from the respective QCL assumptions for the plurality of PDSCH communications, and
      wherein the phase continuity is determined to be maintained between the one or more first PDSCH communications and the one or more second PDSCH communications based at least in part on a determination that a QCL type associated with a spatial receive parameter is not configured for PDSCH reception.

6. The method of claim 1, further comprising:
   receiving a communication between one or more first PDSCH communications and one or more second PDSCH communications of the plurality of PDSCH communications,
      wherein the communication is a synchronization signal block (SSB) communication,
      wherein the communication is associated with a QCL assumption that is different from the respective QCL assumptions for the plurality of PDSCH communications, and
      wherein the phase continuity is determined to be maintained between the one or more first PDSCH communications and the one or more second PDSCH communications based at least in part on a determination that a QCL type associated with a spatial receive parameter is not configured for PDSCH reception or a determination that the QCL type associated with the spatial receive parameter is configured for PDSCH reception and that the SSB is a QCL source for the one or more first PDSCH communications and the one or more second PDSCH communications.

7. The method of claim 1, wherein the plurality of PDSCH communications are repetitions or are scheduled by semi-persistent scheduling, and
   wherein the phase continuity is determined to be maintained between one or more first PDSCH communications and one or more second PDSCH communications, of the plurality of PDSCH communications, based at least in part on a determination that another communication is not received between the one or more first PDSCH communications and the one or more second PDSCH communications or a determination that another communication, associated with a same QCL assumption as the respective QCL assumptions of the plurality of PDSCH communications, is received between the one or more first PDSCH communications and the one or more second PDSCH communications.

8. The method of claim 7, wherein a bundling window for the DMRS bundling corresponds to a duration of the repetitions or a duration of the semi-persistent scheduling.

9. The method of claim 1, further comprising:
   transmitting or receiving an indication of whether phase continuity is to be maintained following a change in a QCL assumption during a duration of the plurality of PDSCH communications.

10. The method of claim 1, wherein the indication that the plurality of PDSCH communications are associated for purposes of DMRS bundling is without regard to whether there is a change in a QCL assumption for communications received by the UE.

11. The method of claim 1, wherein the indication that the plurality of PDSCH communications are associated for purposes of DMRS bundling is with regard to whether there is a change in a QCL assumption for communications received by the UE.

12. The method of claim 1, wherein the indication indicates a reset for associating the plurality of PDSCH communications for purposes of the DMRS bundling when there is a change in a QCL assumption for communications received by the UE.

13. The method of claim 1, wherein a first PDSCH communication, of the plurality of PDSCH communications, is associated with a change in a QCL assumption relative to a previous communication.

14. The method of claim 1, wherein a default QCL assumption for a PDSCH communication, of the plurality of PDSCH communications, is based at least in part on a QCL assumption for a preceding PDSCH communication of the plurality of PDSCH communications.

15. A method of wireless communication performed by a base station, comprising:
   transmitting, to a user equipment (UE), an indication that a plurality of physical downlink shared channel (PDSCH) communications are associated for purposes of demodulation reference signal (DMRS) bundling;

determining whether a phase continuity is to be maintained for the plurality of PDSCH communications based at least in part on respective quasi-co-location (QCL) assumptions for the plurality of PDSCH communications; and transmitting, to the UE, the plurality of PDSCH communications based at least in part on whether the phase continuity is to be maintained.

16. The method of claim 15, wherein the phase continuity is determined to be maintained for the plurality of PDSCH communications based at least in part on a determination that the respective QCL assumptions are the same.

17. The method of claim 15, wherein the phase continuity is determined to be maintained for the plurality of PDSCH communications based at least in part on a determination that respective transmission configuration indicator states, for the plurality of PDSCH communications, are the same.

18. The method of claim 15, wherein the UE is capable of using a single transmission configuration indicator (TCI) state for communication, and wherein the phase continuity is determined to be maintained for the plurality of PDSCH communications based at least in part on a determination that the single TCI state is not changed during a duration of the plurality of PDSCH communications.

19. The method of claim 15, further comprising:

transmitting a communication between one or more first PDSCH communications and one or more second PDSCH communications of the plurality of PDSCH communications, wherein the communication is a physical downlink control channel communication, a channel state information reference signal communication, or an additional PDSCH communication, wherein the communication is associated with a QCL assumption that is different from the respective QCL assumptions for the plurality of PDSCH communications, and wherein the phase continuity is determined to be maintained between the one or more first PDSCH communications and the one or more second PDSCH communications based at least in part on a determination that a QCL type associated with a spatial receive parameter is not configured for PDSCH reception.

20. The method of claim 15, further comprising:

transmitting a communication between one or more first PDSCH communications and one or more second PDSCH communications of the plurality of PDSCH communications, wherein the communication is a synchronization signal block (SSB) communication, wherein the phase continuity is determined to be maintained between the one or more first PDSCH communications and the one or more second PDSCH communications based at least in part on a determination that a QCL type associated with a spatial receive parameter is not configured for PDSCH reception or a determination that the QCL type associated with the spatial receive parameter is configured for PDSCH reception and that the SSB is a QCL source for the one or more first PDSCH communications and the one or more second PDSCH communications.

21. The method of claim 15, wherein the plurality of PDSCH communications are repetitions or are scheduled by semi-persistent scheduling, and wherein the phase continuity is determined to be maintained between one or more first PDSCH communications and one or more second PDSCH communications, of the plurality of PDSCH communications, based at least in part on a determination that another communication is not transmitted between the one or more first PDSCH communications and the one or more second PDSCH communications or a determination that another communication, associated with a same QCL assumption as the respective QCL assumptions of the plurality of PDSCH communications, is transmitted between the one or more first PDSCH communications and the one or more second PDSCH communications.

22. The method of claim 21, wherein a bundling window for the DMRS bundling corresponds to a duration of the repetitions or a duration of the semi-persistent scheduling.

23. The method of claim 15, further comprising:

transmitting or receiving an indication of whether phase continuity is to be maintained following a change in a QCL assumption during a duration of the plurality of PDSCH communications.

24. The method of claim 15, wherein the indication that the plurality of PDSCH communications are associated for purposes of DMRS bundling is without regard to whether there is a change in a QCL assumption for communications transmitted to the UE.

25. The method of claim 15, wherein the indication that the plurality of PDSCH communications are associated for purposes of DMRS bundling is with regard to whether there is a change in a QCL assumption for communications transmitted to the UE.

26. The method of claim 15, wherein the indication indicates a reset for associating the plurality of PDSCH communications for purposes of the DMRS bundling when there is a change in a QCL assumption for communications transmitted to the UE.

27. The method of claim 15, wherein a first PDSCH communication, of the plurality of PDSCH communications, is associated with a change in a QCL assumption relative to a previous communication.

28. The method of claim 15, wherein a default QCL assumption for a PDSCH communication, of the plurality of PDSCH communications, is based at least in part on a QCL assumption for a preceding PDSCH communication of the plurality of PDSCH communications.

29. A user equipment (UE) for wireless communication, comprising:

a memory; and one or more processors operatively coupled to the memory, the memory and the one or more processors configured to:

receive, from a base station, an indication that a plurality of physical downlink shared channel (PDSCH) communications are associated for purposes of demodulation reference signal (DMRS) bundling;

determine whether a phase continuity is to be maintained for the plurality of PDSCH communications based at least in part on respective quasi-co-location (QCL) assumptions for the plurality of PDSCH communications; and process the plurality of PDSCH communications based at least in part on whether the phase continuity is to be maintained.

30. The UE of claim 29, wherein the phase continuity is determined to be maintained for the plurality of PDSCH communications based at least in part on a determination that the respective QCL assumptions are the same.

31. The UE of claim 29, wherein the phase continuity is determined to be maintained for the plurality of PDSCH communications based at least in part on a determination that respective transmission configuration indicator states, for the plurality of PDSCH communications, are the same.

32. A base station for wireless communication, comprising:
- a memory; and
- one or more processors operatively coupled to the memory, the memory and the one or more processors configured to:
    - transmit, to a user equipment (UE), an indication that a plurality of physical downlink shared channel (PDSCH) communications are associated for purposes of demodulation reference signal (DMRS) bundling;
    - determine whether a phase continuity is to be maintained for the plurality of PDSCH communications based at least in part on respective quasi-co-location (QCL) assumptions for the plurality of PDSCH communications; and
    - transmit, to the UE, the plurality of PDSCH communications based at least in part on whether the phase continuity is to be maintained.

33. The base station of claim 32, wherein the phase continuity is determined to be maintained for the plurality of PDSCH communications based at least in part on a determination that the respective QCL assumptions are the same.

34. The base station of claim 32, wherein the phase continuity is determined to be maintained for the plurality of PDSCH communications based at least in part on a determination that respective transmission configuration indicator states, for the plurality of PDSCH communications, are the same.

35. An apparatus for wireless communication, comprising:
- means for receiving, from a base station, an indication that a plurality of physical downlink shared channel (PDSCH) communications are associated for purposes of demodulation reference signal (DMRS) bundling;
- means for determining whether a phase continuity is to be maintained for the plurality of PDSCH communications based at least in part on respective quasi-co-location (QCL) assumptions for the plurality of PDSCH communications; and
- means for processing the plurality of PDSCH communications based at least in part on whether the phase continuity is to be maintained.

* * * * *